(12) United States Patent
Muschelknautz et al.

(10) Patent No.: US 7,316,564 B2
(45) Date of Patent: Jan. 8, 2008

(54) METHOD AND INSTALLATION FOR REGULATING THE QUANTITY OF CIRCULATING SOLIDS IN A CIRCULATING FLUIDIZED BED REACTOR SYSTEM

(75) Inventors: Ulrich Muschelknautz, Innsbruck (AT); Bernhard Röper, Bergheim (DE)

(73) Assignee: ALSTOM Technology Ltd., Baden (DE)

( * ) Notice: Subject to any disclaimer, the term of this patent is extended or adjusted under 35 U.S.C. 154(b) by 33 days.

(21) Appl. No.: 11/254,907

(22) Filed: Oct. 20, 2005

(65) Prior Publication Data

US 2006/0230995 A1 Oct. 19, 2006

(30) Foreign Application Priority Data

Oct. 22, 2004 (DE) .................. 10 2004 051 477

(51) Int. Cl.
*F27B 15/02* (2006.01)
(52) U.S. Cl. .................. 432/16; 432/58; 122/488
(58) Field of Classification Search .......... 122/4 D, 122/34, 488, 489; 432/58, 15–17; 110/245, 110/345, 346
See application file for complete search history.

(56) References Cited

U.S. PATENT DOCUMENTS

| | | | | |
|---|---|---|---|---|
| 2,607,438 A | * | 8/1952 | Bradford | ............ 96/376 |
| 3,273,320 A | * | 9/1966 | Delaune et al. | ............ 55/434.1 |
| 3,802,570 A | * | 4/1974 | Dehne | ............ 210/304 |
| 4,337,032 A | * | 6/1982 | Duplouy et al. | ............ 432/106 |
| 4,344,538 A | * | 8/1982 | Fujisawa et al. | ............ 209/719 |
| 5,265,984 A | * | 11/1993 | Nakagawa | ............ 406/155 |
| 5,465,690 A | * | 11/1995 | Viel Lamare et al. | ...... 122/4 D |
| 5,771,844 A | * | 6/1998 | Dietz | ............ 122/4 D |
| 6,938,780 B2 | * | 9/2005 | Baglione et al. | ............ 209/717 |

* cited by examiner

*Primary Examiner*—Gregory Wilson
(74) *Attorney, Agent, or Firm*—Alix, Yale & Ristas, LLP

(57) ABSTRACT

A method for regulating the quantity of circulating solids in a circulating fluidized bed reactor system, whereby a solid flow/gas flow mixture leaving the fluidized bed reactor is fed tangentially into at least one cyclone separator for separation of the solid from the gas flow. The gas flow that is exhausted via a gas outflow opening of the cyclone separator. The solid that has been separated in the cyclone separator is reintroduced into the fluidized bed reactor via a recirculation line. A partial quantity of the solid flow quantity is diverted from the wall of the cyclone separator by means of a jet blast of at least one gaseous free jet formed by the nozzle into the gas outflow opening. The remaining residual quantity is fed into the recirculation line, whereby the particle spectrum of the circulating solid flow quantity in the circulating fluidized bed reactor system is largely maintained after separation into the two partial solid flow quantities as well as an installation for implementing the method.

20 Claims, 3 Drawing Sheets

METHOD AND INSTALLATION FOR REGULATING THE QUANTITY OF CIRCULATING SOLIDS IN A CIRCULATING FLUIDIZED BED REACTOR SYSTEM

BACKGROUND OF THE INVENTION

The invention relates to a method for regulating the quantity of circulating solids in a circulating fluidized bed reactor system as well as to an installation for implementing the method.

Fluidized bed reactor systems are known for the most varied applications, for example in the chemical industry or in energy and power plant engineering. In the latter application, fossil fuels like coal or other combustible materials such as waste or fuels derived from waste or biomass are burned or gasified in the fluidized bed of the fluidized bed reactor. To separate and recirculate the majority of the solid particles (ash and inert material) contained in the exhaust gas in the fluidized bed reactor or in the combustion chamber, the fluidized bed reactor system exhibits one or several attached cyclone separators, generally to the side of the combustion chamber. The separated solid particles are then recirculated back into the combustion chamber. The clean gas from the cyclone separator(s) is then fed into a gas flue with convection passes in which the heat contained in the exhaust gas is transferred to a working medium (water/steam) for energy generation. (See journal Kraftwerkstechnik, Springer Verlag, 1994:2, chapter 4.3.2.3.3, "Circulating fluidized bed combustion" [pages 151 to 155], Dr. eng. Karl Strauβ).

To optimize firing with a circulating fluidized bed, an effort is made to have filtration efficiency be as high as possible and low effective separating sizes in the cyclone separators. The higher the filtration efficiency and the lower the effective separating size, the greater the quantity of circulating solids, and therefore the finer their particle size. Using a suitable cyclone separator design, it is now possible to achieve circulating material with an average particle size of $d_{50}$ (50% by mass of the circulating solid particles are larger than $d_{50}$) of 100 μm and less, and a cyclone separation rate of up to 99.9%. The advantages of these modern cyclone separators for the process of circulating fluidized bed combustion are as follows:

good heat transfer in the fluidized bed burner;
little additional fluidized bed material or additional use of circulating material;
good limestone use;
little deterioration of the convection passes that come in contact with the circulating solid material (e.g., tube walls and tube bundles in the fluidized bed cooler);
improved complete combustion of the fuel particles.

However, these modern optimized cyclones have a disadvantage in that when fuels are introduced, their ash contributes greatly to the quantity of circulating solids and the flow of circulating solids becomes so great that serious operational breakdowns may occur. This problem is particularly serious where fuels are used whose ash content and/or ash characteristics vary greatly, i.e., when the fuels form varying amounts of fine-grained circulating material (i.e., material that can circulate in a fluidized bed). Transiently—when using a fuel with a high ash content—there is then too much ash and therefore too much solid in circulation. The operational breakdowns that result include, for example:

a decrease in the temperature in the fluidized bed combustion chamber, resulting in exceeding the desired temperature of the working medium;
overloading the external circulating ash system, resulting, for example, in plugging of the waste pipe or recirculation lines;
overflow of the combustion chamber distribution plate as a result of too much fluid bed material in suspension, with the result, for example, that the installation breaks down because of primary fan overload.

It is generally advantageous for operating installations with a circulating fluid bed when both the quantity and particle size of the fluid bed material can be changed. This is why apart from the possibility of drawing off fluid bed material, so-called bed ash, from the distribution plate of the combustion chamber, i.e., to reduce the quantity of solid in the combustion chamber, a second possibility for effecting particle size of the fluidized material is generally provided, such as the use of ash sifters with devices to recirculate the ash, or the addition of supplemental inert material (noncombustible solids such as sand) with a specified particle size. However, these measures are aimed at fine-grained solids, i.e., they lead to an increase in the quantity of circulating solids.

If, however, enough fine-grain circulating material is generated from the fuel, targeted removal of this partial quantity from the quantity of circulating solids is required for stable operation.

The ash removal systems generally used on the distribution plate of the combustion chamber are, however, hardly able to remove the fine-grain solid particles because these are in almost constant circulation in the fluidized bed reactor system.

A cyclone, in particular a cyclone separator or cyclone sifter is known from printed publication DE 196 30 472 A1, which provides for the extraction of particles from the circulating solid flow that are separated out in the cyclone via the clean gas line of the cyclone. This extraction of particles is implemented by a device that interrupts the flow of gas particles and that is located in the inflow region, in an inflow housing, and/or in the cylindrical housing component, whereby the interrupting device may, among other things, be a blowing device. This interrupting device causes a loosening of the solid strands that form on the internal diameter of the cyclone separator, as a result of which improved separation of solid from gas is made possible, in particular without the undesirable ultrafine particles. In the process, use is made of the fact that after the strands are dissolved into their component particles, the fine particles are drawn off from the gas flow of the cyclone that is directed inward, and clean gas is added, while the rest of the particles are spun against the wall as a result of centrifugal forces, where they form a new strand. The use of such a cyclone in a circulating fluidized bed reactor system will lead, as described above, to a reduction in the proportion of fine material in circulation, and therefore to a disadvantageous and undesirable coarsening of their particle size.

A method for operating a fluidized bed reactor system is known from printed publication EP 0 889 943 B1, wherein a partial quantity of the solids circulating in the system is diverted for the purpose of cleaning the cooling surface in the gas cooler, and is fed into the gas cooler that is downstream from the particle separator. Mechanical cleaning and removal of deposits at the cooling surfaces results from the solid particles that have been diverted and introduced into the gas cooler. However, costly pipes are required for the purpose of diverting solids, which must be designed to withstand operating temperatures of at least 800° C.; control mechanisms such as gates, servo motors, and the like are required, which also add considerably to the cost.

A further method for operating a fluidized bed reactor system is known from printed publication DE 695 04 524 T2, whereby the reactor is a CFB reactor (CFB =Circulating Fluidized Bed), which exhibits a particle separator or cyclone separator between the reactor gas outflow and the gas cooler, which normally functions in a first separation such that it does not permit solids to get into the gas cooler in quantities and sizes sufficient to clean it. In order to introduce a sufficient quantity of solid into the gas cooler, a partial quantity of the quantity of circulating solids is extracted by reducing the separation capacity of the cyclone separator. This is done by entraining a fluid flow into the vortex present in the cyclone separator, which interrupts the vortex and as a result reduces separation capacity in comparison to normal separation capacity. In this method or system, it has been shown to be disadvantageous that, on the one hand, the vortex is interrupted within the cyclone separator and, on the other hand, that a very large quantity of fluid flow (approximately 10% of the gas circulating in the system) is necessary in order to affect the vortex. Because compressed air or steam is usually used as the fluid flow, the corresponding equipment is also required, which reduces the total effectiveness of the installation. Finally, the use of such a fluid flow increases the cost of operation considerably.

A cyclone separator is known from printed publication DE 41 36 935 A1, in which the separation can be adapted to the particular conditions of operation. This is done by providing devices or nozzles in the channel for gas inflow and/or at the immersion pipe for gas outflow, by which the flow and pressure conditions in the cyclone separator can be adjusted, or by which a gaseous medium can be entrained and distributed over the circumferential cross-section of the pipe in question. In order to achieve the desired decrease in diameter using the gaseous medium in the pipes in question, a large quantity of gaseous medium is required, which disadvantageously increases operational costs. In addition, a more cost-intensive use of large nozzles and feeder lines and ring lines and the like is needed in order to entrain the gaseous medium.

All of the described fluidized bed reactor systems or cyclone separators in which a partial quantity of the circulating solids is extracted from circulation and entrained into the clean gas have the disadvantage that their construction is either very costly and therefore cost-intensive in terms of construction and operation, or that only a certain partial quantity of the solid particle spectrum is separated or extracted, leading to the undesirable concentration of another particle spectrum in the system.

SUMMARY OF THE INVENTION

The task of the present invention is to propose a method for regulating the quantity of solids in circulation in a circulating fluidized bed reactor system, as well as an installation for implementing this method, in which the previously cited disadvantages are largely avoided. In particular, it is the task of the present invention to find a simple technical solution for the targeted extraction of circulating solids from the fluidized bed process, i.e., as needed and controllable in terms of quantity. To the extent that there is no need to extract solids, it is the further task of the present invention that the measures taken not interfere with the fluidized bed system, i.e., the fluidized bed reactor is to retain its original operational characteristics when the measures or device, respectively, according to the invention are taken out of operation.

According to the solution according to the invention, a method and an installation for regulating the quantity of circulating solids in a circulating fluidized bed reactor system is created that, for example, exhibits the following advantages:

No additional expensive and technically fragile solid removal devices are needed for removing the circulating solid material.

The sensible heat of the extracted solids is utilized.

The use of blast mediums can be kept to a minimum and is in the order of 1% of the quantity of exhaust gas or steam that is produced.

Blast media are only added as needed and can be easily taken out of operation by operating personnel.

After the measures have been turned off, the cyclone separator is in its original state or operational state, i.e., the measures undertaken to remove partial quantities of circulating solids do not permanently modify the operational behavior of the cyclone.

The measures according to the invention are suitable for manual and automatic operation.

One advantageous further development of the invention provides that the open jet exhibits at least the speed of sound upon exiting the nozzle. This optimizes the effectiveness of the separation of partial quantities of solid.

It is advantageous to use either air, steam, or the exhaust from the fluidized bed reactor, or a combination thereof for the gaseous medium that is entrained into the cyclone separator by means of the open jet from the nozzle. All of these media may be taken either from the surroundings or from the fluidized bed reactor system itself, and are therefore easily available. The steam used can be either taken from behind the low-pressure turbine-as low-pressure steam-or from the supply system of the soot blowers that are provided for cleaning the convection passes.

In order to optimize the use of the open jet exiting from the nozzle, the position of the nozzle must be arranged in a particular region of the wall of the cyclone separator. Advantageously, this region is in an angular range $\gamma$ between 30° and 180° proceeding from a plane E that passes through the middle of the cyclone and perpendicular to the tangential entrainment direction of the solid flow or gas flow in the cyclone separator, and whereby the angular range $\gamma$, seen in the direction of flow of the solid flow/gas flow mixture, extends from plane E or downstream from plane E, respectively.

In a further advantageous development of the invention, the free jet exits at bilateral angles $\alpha_1$, $\alpha_2$ of 0° to 50° in comparison to the radial R that are directed toward the middle of the cyclone in the cyclone separator as seen from the nozzle, whereby the angles $\alpha_1$, $\alpha_2$ extend to the cross-sectional plane of the cyclone separator that passes through the nozzle or jet opening, respectively. This measure results in an improvement in the effectiveness of the open jet, whereby a further optimization can be achieved by directing the free jet against the circumferential flow direction of the solid flow that is entrained into the recirculation line.

The effectiveness of the jet blast of the free jet can be further optimized in that the free jet exhibits an axial component in the direction of the longitudinal axis of the cyclone separator, whereby the axial component of the free jet exhibits a first angle $\beta_1$ of between 0° and 80° or a second angle $\beta_2$ of between 0° and 30° in comparison to the norm for the cyclone longitudinal axis, whereby the axial component of $\beta_1$ points in the direction of the gas outflow opening and the $\beta_2$ points in the opposite direction. In a functional development, the free jet exhibits an axial component at an angle β1 of 10° to 50° in comparison to the norm for the longitudinal axis of the cyclone, and in a further advantageous development, the free jet points in the direction of the gas outflow opening.

One advantageous development is that when using two or several nozzles in either one or several cyclone separator(s), control of the partial quantity of the solid flow into the gas outflow opening is implemented by switching one or several nozzles on or off. By this measure, the quantity of circulating solids in a circulating fluidized bed reactor system can be controlled in a very simple manner. A further possibility of control of the quantity of circulating solids results in that the nozzles are advantageously provided with diameters of varying sizes so that jets are generated that have varying amounts of jet medium throughflow, which in turn diverts partial quantities of varying size of the solid flow into the gas outflow opening. A further advantageous development is that the diversion of a partial quantity of the solid flow fed into the recirculation line occurs transiently by means of a jet blast, i.e., the jet is operated only as needed, and not otherwise.

Operationally, diversion of a partial quantity of the solid flow is implemented by a manual or automatic control of the jet and its gaseous medium control system. Manual operation, however, requires servicing on-site, but in terms of devices it is very cost-effective. Automatic operation, on the other hand, requires more costly devices, but it its more simple operation has its advantages. It is advantageous to control the operation of the jet in an automatic manner dependent on the operational parameters of the fluidized bed reactor and/or the operational parameters of the separation devices for the solids in the fluidized bed reactor system. These measures enable the reactor system to be operated along regulated paths, and in such a manner that only the quantity of solids required by the reactor system circulates. It has shown itself to be advantageous that the diverted partial quantity be between 0.01% to 10% of the quantity of solid flow.

In an advantageous development of the invention, the fluidized bed reactor is implemented as a combustion chamber and is used to burn combustible material such as fossil fuels and/or biogenic fuels and/or waste or fuels derived from waste. This measure makes it possible to use the fluidized bed reactor system according to the invention in steam power plants to produce power.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
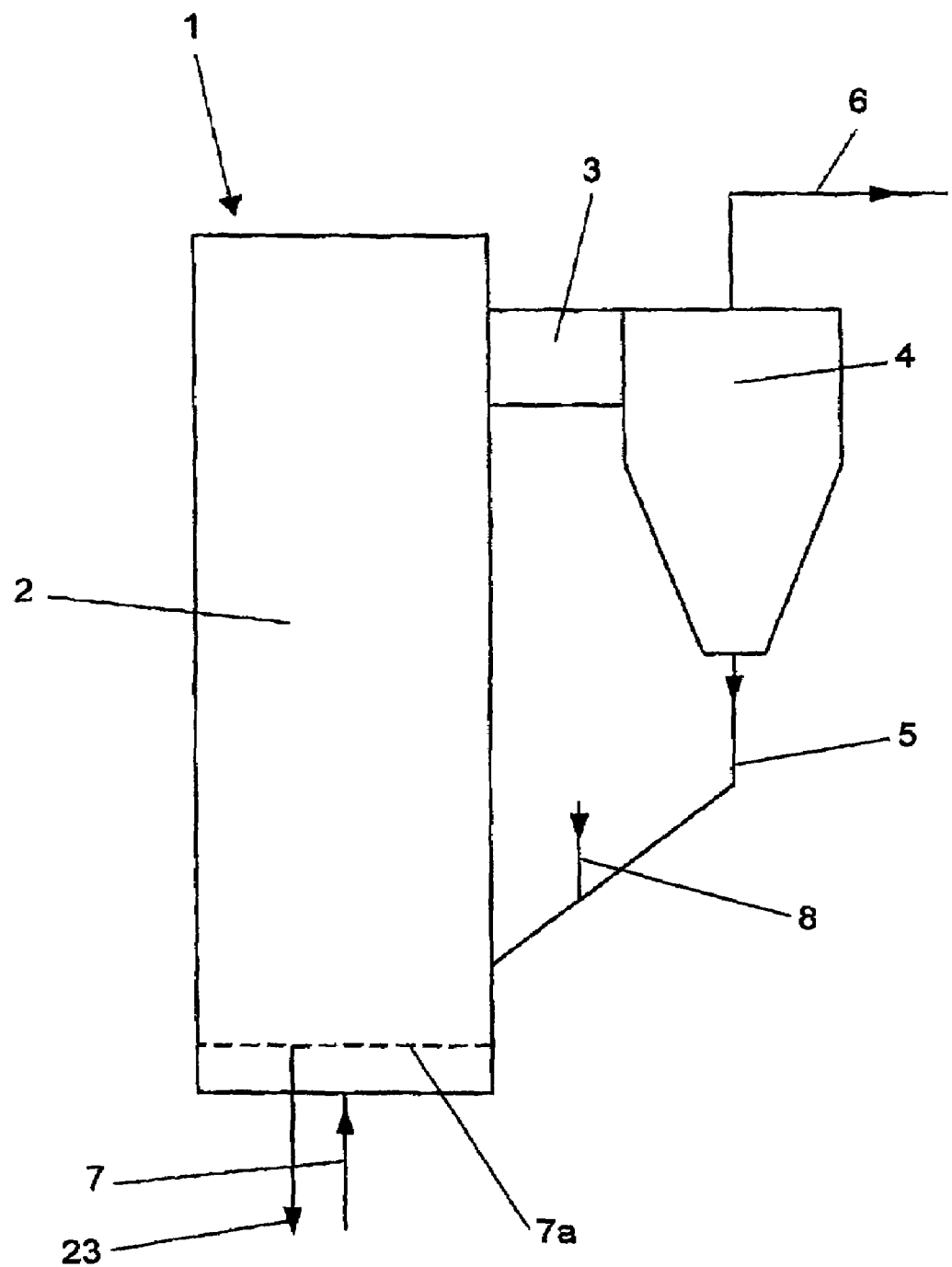
FIG. 1 is a schematic of a circulating fluidized bed reactor system.

FIG. 1 shows a schematic diagram of a circulating fluidized bed reactor system 1 that exhibits a fluidized bed reactor 2. In the embodiment shown here, the fluidized bed reactor system 1 is used in an energy recovery plant that is not depicted, and to burn solid fuel that is thus combusted in the reactor or in the combustion chamber 2, respectively. The solid fuel, in particular fossil fuel such as coal, but also waste material or fuels derived from waste material, biomass, or the like along with additives as needed, is fed via a feeder line 8 and a recirculation line 5 into the combustion chamber 2. A fluidizing medium that is also an oxidation medium, generally air, is fed into the combustion chamber 2 via a feeder line 7 and a distribution plate 7a in order to enable burning of the fuel, on the one hand, and to maintain the fluidized bed in the combustion chamber 2, on the other. The exhaust gas that results from combustion as well as a part of the solid that is located in the combustion chamber 2, which consists of ash particles of varying size, inert material (noncombustible components), and unburned particles, is fed via a gas line/solid line 3 as solid flow/gas flow mixture 9 to one or several cyclone separator(s) 4. In many cyclone separators 4 these are generally switched parallel to each other in terms of throughput of the solid flow/gas flow mixture 9.

Extensive separation of the solids contained in the solid flow/gas flow mixture 9 occurs in the cyclone separator 4, which represents a centrifugal force separator, whereby a quantity of the separated solid flow 11 is fed into the combustion chamber 2 via the cyclone separator 4 with the connected recirculation line 5 of the fluidized bed chamber 2. This leads to an (external) circulation of a part of the solid via the cyclone separator 4 within the fluidized bed reactor system 1. The exhaust gas or the gas flow 10 emitted by the cyclone separator 4, respectively, escapes via a gas outlet pipe 6 and is generally fed with a gas flue (not depicted) implemented with heat convection passes. Here, the hot gas transfers its heat to a working medium for the purpose of energy recovery, in general water or steam that circulates within the heat convection passes. Coarser solid particles in particular, that do not participate in the circulation of solid material or the circulation of solids within the fluidized bed reactor system 1 can be exhausted from the fluidized bed combustion chamber 2 via the solid outflow device 23 provided in the fluidized medium distribution plate 7a.

Figure 2:
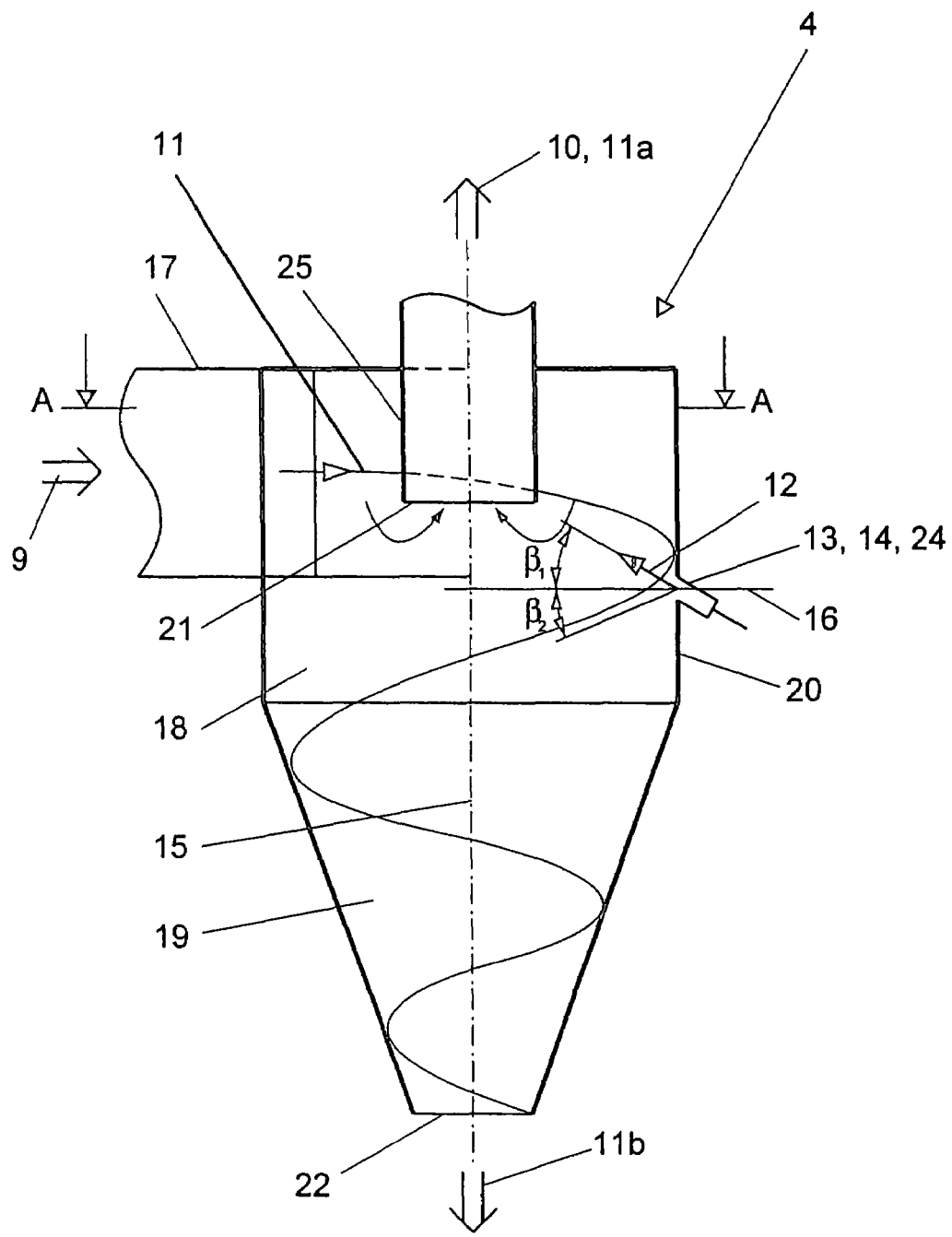
FIG. 2 is a schematic longitudinal view through the cyclone separator of the circulating fluidized bed reactor system, according to segment B-B in FIG. 3.
Figure 3:
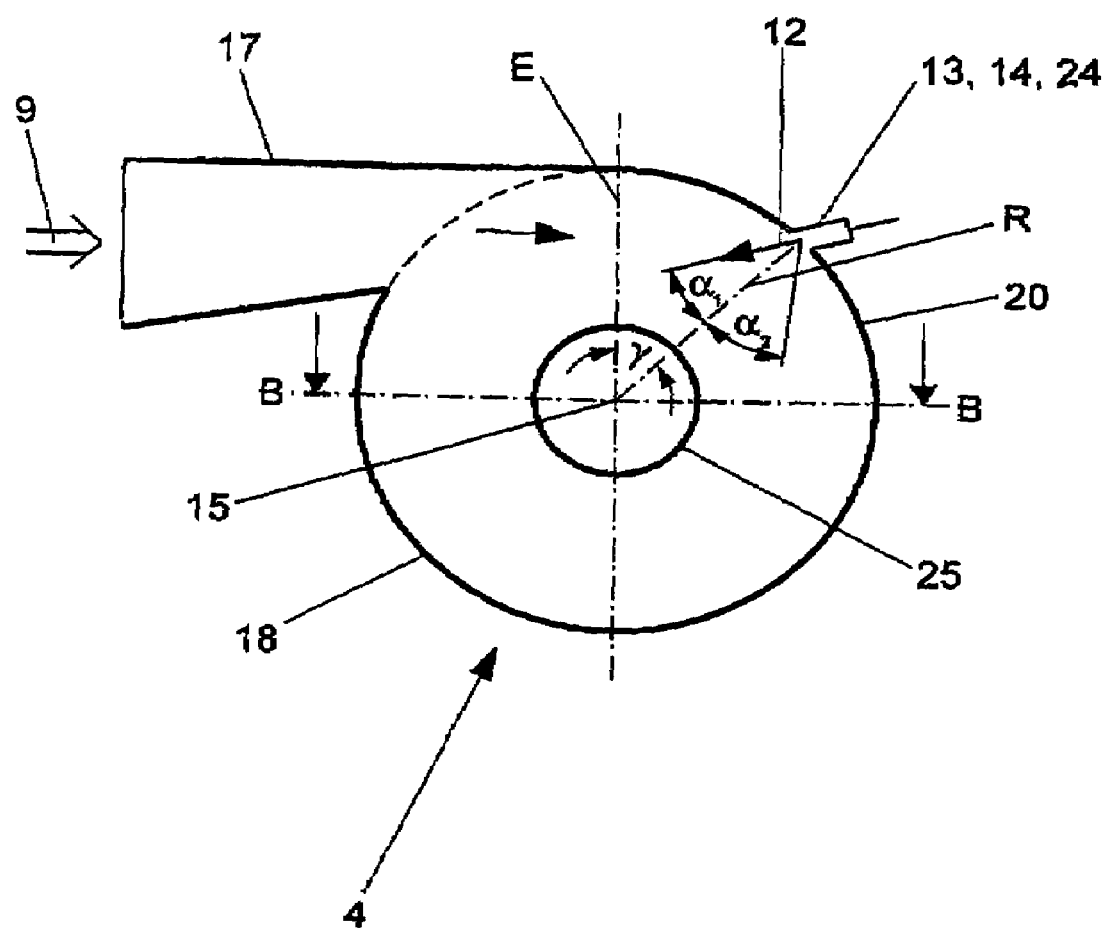
FIG. 3 is a schematic cross-section through the cyclone separator of the circulating fluidized bed reactor system, according to segment A-A in FIG. 2.

FIGS. 2 and 3 show a longitudinal view and a cross-section of the cyclone separator 4, whereby here, for example, a vertical cyclone separator 4 is used that extends along the longitudinal axis of the cyclone 15. The separator 4 exhibits a cyclone inflow 17 at its upper end, through which the solid flow/gas flow mixture 9 is fed tangentially into the separator 4. The depicted cyclone separator 4 has, for example, a slit-shaped inflow 17. The method according to the invention can also be used in a cyclone separator with a spiral-shaped inflow (not depicted), wherein the solid flow/gas flow mixture 9 is also fed tangentially into the separator 4. A cylindrical part 18 and subsequently a conical part 19 with an outflow opening 22 at the lower end of the cyclone separator 4 is attached below the inflow 17, whereby the cyclone separator 4 is formed by walls 20 consisting of the wall of the cylindrical part 18, the walls of the cyclone inflow 17, the wall of the conical part 19 as well as the roof of the cyclone. The roof of the cyclone is provided with a gas outflow opening 21. The outflow opening 21 may either be the lower opening of an immersion pipe 25 that it is provided in the roof of the separator 4 as shown in FIG. 2, or an opening directly into the roof of the separator 4. As depicted in particular in FIG. 2, the solid flow/gas flow mixture 9 entering into the cyclone separator 4 is largely separated by the centrifugal forces brought to bear in the separator 4, whereby the separated solid flow 11 is fed through the outflow opening 22 of the recirculation line 5, and the gas flow 10 is fed as clean gas through the outflow opening 21 of the gas exhaust pipe 6. In the process, the separated solid 11 moves spirally in the cylindrical 18 and conical 19 part of the cyclone separator 4, forming a later of locally variable thickness along the wall 20 of the separator 4 in the direction of the outflow opening 22.

In order to control the quantity of solid in circulation in a circulating fluidized bed reactor system 1, a partial quantity 11a of the solid flow 11 that is separated from the solid flow/gas flow mixture 9 and flows by the wall 20 in the form of a layer, is fed in a targeted manner into the gas outflow opening 21 from at least one of the gaseous free jets 12 formed by a nozzle 13, and the remaining residue 11b is fed to the recirculation line 5. In the free jet 12, the solid particles that flow into the flow path of the nozzle opening 24 of the nozzle 13 experience a strong acceleration away from the wall 20 into the interior of the cyclone. As a result of the high circumferential speed of the rotating solid layer or solid carpet, respectively, along the wall 20, the free jet 12 cuts a strip of solid that is several meters in length from the rotating solid carpet within, for example, one second, and blows it into the interior of the cyclone. In this manner, a considerable quantity of solid is hit by the free jet 12 and directed inward. After leaving the area of the free jet, the particles move under the influence of their inertia and of the cyclone flow field by means of crooked channels to the region immediately below the gas outflow opening 21, where they are suctioned off by means of the clean gas flow 10.

According to the invention, the particle spectrum of the circulating solid flow quantity is largely maintained after being divided into the two solid flow streams 11a and 11b. In other words, this means that a partial quantity 11a of each particle size class of the solid flow quantity 11 is "blown out" by the gaseous free jet 12 and directed into the gas outflow opening 21 so that, according to the invention, no significant screening or sifting of the circulating solid occurs, but rather the mass flow of the circulating solid is affected. By blowing out or "expelling" a partial quantity 11a from the solid flow quantity 11 into the gas outflow opening 21, undesirable and disadvantageous changes in the particle spectrum of the circulating solid are avoided, which, as already discussed above, would come to the same thing as screening or sifting of the circulating material.

The nozzle 13 is depicted as being formed on the wall 20 of the cyclone separator 4, such that no parts of the nozzle 13 protrude or project inward into the interior of the separator 4 or its wall 20, and therefore no frictional contact points form for the solids 11 that are circulating within the cyclone separator 4. The free jet 12 emitted from the nozzle 13 exhibits at least the speed of sound upon exiting from the nozzle opening 24, whereby the gaseous medium used consists of either air, steam, or the outflow from a fluidized bed reactor, or of a combination thereof. When using steam, either low-pressure steam is taken from the water/steam circulation of the fluidized bed reactor system 1, or it is taken from a supply system for the soot blowers that are used in the reactor system 1. In order to achieve speeds above the speed of sound, a nozzle geometrically shaped like a Laval nozzle may be used. The pre-pressure for the blowing medium or jet medium, respectively, is selected according to the desired exhaust speed through the nozzle.

The position of the nozzle 13 in the wall 20 of the cyclone separator 4 is shown in FIGS. 2 and 3. FIG. 3 shows the cross-section of the cyclone separator 4 with its middle and its longitudinal axis 15, respectively, and a tangential inflow of the solid flow/gas flow mixture 9. A virtual plane E that is perpendicular to the tangential direction of inflow of the solid flow/gas flow mixture 9 into the cyclone separator 4 and that passes through the middle of the cyclone is used to determine the position of the nozzle 13. Proceeding from the plane E and in the flow direction of the solid flow/gas flow mixture 9, the nozzle 13 is implemented at an angular range γ of between 30° and 180° and downstream from the plane E in the wall 20 of the cyclone separator 4.

FIG. 2 shows that the free jet 12 exhibits an axial component in the direction of the longitudinal axis 15 of the cyclone separator 4, whereby the axial component of the free jet 12 exhibits a first angle β1 of between 0° and 80° or a second angle β2 of between 0° and 30° in comparison to the norm 16 to the cyclone longitudinal axis, and whereby the free jet 12 points in the direction of the gas outflow opening 21 by the first angle β1 and away from the gas outflow opening 21 by the second angle β2. Advantageously, the free jet 12 points in the direction of the gas outflow opening 21, and the axial component points at a first angle β1 of 10° to 50° in comparison to the norm 16 to the cyclone longitudinal axis. In addition to the axial component of the free jet 12, it also exhibits another component in relation to the horizontal plane which, as shown in FIG. 3, deviates from the intended radial R by angles β1, β2, whereby the radial pointing toward the middle of the cyclone passes through the nozzle opening 24 of the nozzle 13 that is freed up by the free jet 12. Advantageously, the free jet points in the direction of the cyclone inflow 17 at an angle a1, and is directed against the flow direction of the solid flow/gas flow mixture 9 entering the cyclone separator 4. Alternately, the free jet 12 can be directed at an angle a2 in the flow direction of the solid flow/gas flow mixture 9 entering the cyclone separator 4. Advantageously, the free jet 12 exits the separator 4 at an angle β1, β2 of 0° to 50°.

An embodiment of the invention not depicted here provides for two or more nozzles 13 in one or more cyclone separators 4. Control of the divergent partial quantity 11a of the solid flow quantity 11 can be accomplished by switching on or off one or several nozzles 13. The arrangement of two or more nozzles 13 and the orientation of the free jet 12 in one or several cyclone separator(s) 4 can be accomplished under the same characteristics as previously noted for a nozzle 13, that is, within the previously noted angular range.

Extraction of solids 11a that can be regulated in a stepwise manner can, for example, be implemented in that nozzles 13 having varying nozzle diameters and therefore permitting varying quantities of blow medium throughput are used in the individual cyclones 4. For example, a nozzle 13 that extracts ⅓ of the maximum required quantity of solid 11a can be mounted in one of the cyclones 4 in an installation having two cyclones 4, and another nozzle 13 that extracts ⅔ of the maximum required quantity of solid 11a can be mounted in the other cyclone 4. By operating one of the two nozzles 13 or both nozzles 13 together, 33%, 67%, or 100% of the maximum required quantity of solid 11a can be extracted.

Alternately, diversion of a partial quantity 11a of the solid flow quantity 11 can occur transiently by means of a jet blast, i.e., the diversion of the partial quantity 11a is implemented according to transient operational requirements, and accordingly the free jet 12 from the nozzle 13 may or may not be enter into the cyclone 4.

Both the nozzle 13 and its supply system 14 (supply lines, shutoff armatures, devices for adjusting quantities and for measurement, pressure measurement devices, etc.) for gaseous medium can be operated either manually or automatically, and therefore also the initiation of the free jet 12 in the cyclone separator 4. When operated automatically, the nozzle 13 can be controlled dependent on the operational parameters of the fluidized bed reactor 2 and/or the operational parameters of the exhaust devices 23 for the solid of the fluidized bed reactor system 1. The partial quantity 11a that is exhausted through the gas outflow opening 21 is advantageously 0.01% to 10% of the solid flow quantity 11.

The nozzle 13 can also be provided with a shutoff or with purge gas, and with a poke hole, none of which are depicted. As a result, the nozzle 13 can be kept free of ash deposits, or can be cleaned of them.

The method according to the invention can also be used under unstable conditions that require a reduction in the quantity of ash in circulation or the quantity of solid in circulation. One example of this is load reduction in case of interruption, or in cases where the quantity of circulating solid must be extracted because the fluidized bed reactor system 1 has been shut down.

The method according to invention and the installation according to the invention, respectively, can also be retrofitted and used in existing fluidized bed reactor systems without incurring great costs. Because of the low investment costs it pays to install preventively the device for implementing the method according to the invention.

Apart from the examples cited here of a fluidized bed reactor system for burning fuel, fluidized bed reactor systems 1 can also be used, for example, in gasification plants, waste gas purification plants, metallurgical processes, chemical plants, or other processes.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Method for regulating the quantity of circulating solid in a circulating fluidized bed reactor system having a fluidized bed reactor, the method comprising:
   tangentially feeding a solid flow/gas flow mixture leaving the fluidized bed reactor into at least one cyclone separator;
   separating the solid flow from the gas flow within the cyclone separator;
   recirculating at least a portion of solid flow to the fluidized bed reactor through a recirculation line;
   exhausting the gas flow through a gas outflow opening in the cyclone separator; and
   directing a partial quantity of the solid flow quantity from a wall of the cyclone separator to the gas outflow opening with a jet blast from at least one gaseous free jet emitted from a nozzle, whereby a particle spectrum of the solid flow quantity circulating in the circulating fluidized bed reactor system is substantially maintained after separation into two partial quantities of solid flow.

2. Method according to claim 1 wherein directing the partial quantity of the solid flow comprises emitting the free jet from the nozzle at at least the speed of sound.

3. Method according to claim 1 wherein the free jet comprises a gaseous medium selected from air, steam, exhaust gas of the fluidized bed reactor, or of a combination thereof.

4. Method according to claim 3 wherein the gaseous medium comprises low-pressure steam or steam from a supply system for soot blowers.

5. Method according to claim 3 wherein the fluidized bed reactor system also includes a gaseous medium supply system operated manually or automatically.

6. Method according to claim 1 wherein directing the partial quantity of the solid flow comprises emitting the free jet from the nozzle from a region of the wall of the cyclone separator at an angular range $\gamma$ between 30° and 180° proceeding from a plane E, the plane E passing through a longitudinal axis of the cyclone separator and being perpendicular to a tangential inflow direction of the solid flow/gas flow in the cyclone separator, the angular range extending in the direction of flow of the solid flow/gas flow, viewed from the plane E.

7. Method according to claim 1 wherein directing the partial quantity of the solid flow comprises emitting the free jet from the nozzle at a bilateral angle $\alpha 1$, $\alpha 2$ of 0° to 50° relative to a radial R, the radial R extending from the nozzle to a longitudinal axis of the cyclone separator, whereby the angles $\alpha 1$, $\alpha 2$ extend to a cross-sectional plane of the cyclone separator that passes through the nozzle.

8. Method according to claim 7 wherein the free jet is directed within the cyclone separator against a predominant circumferential flow direction of the solid flow portion that is fed into the recirculation line.

9. Method according to claim 1 wherein directing the partial quantity of the solid flow comprises emitting an axial component of the free jet in a direction of a longitudinal axis of the cyclone separator, the axial component of the free jet having a first angle $\beta 1$ of between 0° and 80° or a second angle $\beta 2$ of between 0° and 30° relative to a norm of the longitudinal axis, the axial component of $\beta 1$ extending in a direction of the gas outflow opening and the second angle $\beta 2$ extinding in a direction opposite to the gas outflow opening.

10. Method according to claim 9 wherein the free jet is directed in the direction of the gas outflow opening.

11. Method according to claim 9 wherein the axial component of the free jet has a first angle $\beta 1$ of 10° to 50° relative to the norm to the longitudinal axis of the cyclone separator.

12. Method according to claim 1 wherein the at least one cyclone separator includes a plurality of nozzles, the method further comprising switching on or off at lest one of the plurality of nozzles to control the partial quantity of the solid flow.

13. Method according to claim 1 wherein the nozzle has a diameter, the method further comprising varying the diameter of the nozzle to control the partial quantity of the solid flow.

14. Method according to claim 1 wherein the jet blast is a transient jet blast.

15. Method according to claim 1 wherein the nozzle is operated manually or automatically.

16. Method according to claim 15 wherein the fluidized bed reactor system includes at least one extraction device for removing solids, the fluidized bed reactor and the at least one extraction device having operational parameters, the method further comprising controlling automatic operation the nozzle depending on the operational parameters of the fluidized bed reactor or the operational parameters of the at least one extraction device.

17. Method according to claim 15 wherein the fluidized bed reactor system includes at least one extraction device for removing solids, the fluidized bed reactor and the at least one extraction device having operational parameters, the method further comprising controlling automatic operation the nozzle depending on the operational parameters of the fluidized bed reactor and the operational parameters of the at least one extraction device.

18. Method according to claim 1 wherein the partial quantity of the solid flow comprises 0.01% to 10% of the solid flow.

19. Method according to claim 1 wherein the fluidized bed reactor is a combustion chamber for burning combustible material selected from fossil fuel, biogenic fuel, waste, or fuels derived from waste.

20. A fluidized bed reactor system comprising:
  a fluidized bed reactor producing a solid flow/gas flow mixture;
  at least one cyclone separator including
    an inflow tangentially receiving the solid flow/gas flow mixture,
    a wall directing the solid flow/gas flow mixture in circular pattern whereby the solid flow is separated from the gas flow,
    a gas outflow opening for exhausting the gas flow, and
    at least one nozzle emitting a gaseous free jet defining a jet blast, the jet blast directing a partial quantity of the solid flow quantity from the wall of the cyclone separator to the gas outflow opening; and a recirculation line recirculating at least a portion of solid flow from the cyclone separator to the fluidized bed reactor;

wherein a particle spectrum of the solid flow quantity circulating in the circulating fluidized bed reactor system is substantially maintained after separation into two partial quantities of solid flow.

\* \* \* \* \*